(12) United States Patent
Gerhart et al.

(10) Patent No.: US 12,248,302 B2
(45) Date of Patent: Mar. 11, 2025

(54) SYSTEM AND METHOD FOR FAN CONTROL ACROSS WIDE AMBIENT TEMPERATURES

(71) Applicant: Dell Products L.P., Round Rock, TX (US)

(72) Inventors: Donald W. Gerhart, Leander, TX (US); Alaric Joaquim Narcissius Silveira, Austin, TX (US); Eric Michael Tunks, Austin, TX (US); Balamurugan Gnanasambandam, Bengaluru (IN); Curtis Ray Genz, Round Rock, TX (US); Randy Alton Frazier, New Braunfels, TX (US); Jeffrey Leighton Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 412 days.

(21) Appl. No.: 18/047,830

(22) Filed: Oct. 19, 2022

(65) Prior Publication Data

US 2024/0134350 A1  Apr. 25, 2024
US 2024/0231319 A9  Jul. 11, 2024

(51) Int. Cl.
*G06F 1/20* (2006.01)
*G05B 19/4155* (2006.01)
*G06F 1/3296* (2019.01)

(52) U.S. Cl.
CPC ......... *G05B 19/4155* (2013.01); *G06F 1/206* (2013.01); *G05B 2219/50333* (2013.01)

(58) Field of Classification Search
CPC .............................. G06F 1/206; G06F 1/3296
See application file for complete search history.

(56) References Cited

U.S. PATENT DOCUMENTS

| 6,389,817 B1 * | 5/2002 | Smith ..................... F25B 21/04 |
| | | 62/3.2 |
| 7,698,095 B2 | 4/2010 | Chung et al. |
| 8,550,702 B2 | 10/2013 | Campbell et al. |
| 9,581,985 B2 | 2/2017 | Walser et al. |
| 9,772,664 B1 | 9/2017 | Chou et al. |
| 9,785,208 B2 | 10/2017 | Lovicott et al. |
| 9,820,411 B2 | 11/2017 | Alshinnawi et al. |
| 9,842,003 B2 | 12/2017 | Rao et al. |
| 9,968,011 B2 | 5/2018 | Shabbir et al. |
| 10,156,987 B1 | 12/2018 | Gutierrez et al. |
| 10,191,523 B2 | 1/2019 | Shows et al. |

(Continued)

*Primary Examiner* — Mark A Connolly
(74) *Attorney, Agent, or Firm* — WOMBLE BOND DICKINSON (US) LLP

(57) ABSTRACT

Methods and systems for managing the operation of data processing systems are disclosed. A data processing system may include a computing device that may provide computer implemented services. To provide the computer implemented services, hardware components of the data processing system may need to operate in predetermined manners. To manage the operation of the hardware components, the data processing system may heat them when their temperatures fall outside of thermal operating ranges. The data processing system may implement a distributed management framework for managing the operation of a thermal management subsystem tasked with maintaining the temperatures of the hardware components through heating.

20 Claims, 7 Drawing Sheets

(56) References Cited

U.S. PATENT DOCUMENTS

| | | |
|---|---|---|
| 10,394,294 B2 | 8/2019 | Pfeifer et al. |
| 10,712,033 B2 | 7/2020 | Atchison et al. |
| 10,760,809 B2 | 9/2020 | Gillette et al. |
| 11,009,249 B2 | 5/2021 | Goel et al. |
| 2009/0198387 A1* | 8/2009 | Lin .......................... G06F 1/26 713/2 |
| 2011/0296155 A1* | 12/2011 | Belady ...................... G06F 9/44 713/300 |
| 2013/0015548 A1 | 1/2013 | Chen et al. |
| 2014/0027435 A1 | 1/2014 | Chou |
| 2023/0086310 A1* | 3/2023 | Utz .......................... G06F 1/182 700/202 |
| 2023/0260864 A1* | 8/2023 | Kondapuram ......... H05B 1/023 713/2 |

* cited by examiner

SYSTEM AND METHOD FOR FAN CONTROL ACROSS WIDE AMBIENT TEMPERATURES

FIELD OF THE EMBODIMENTS

Embodiments disclosed herein relate generally to device management. More particularly, embodiments disclosed herein relate to systems and methods for retaining temperatures of components within operating temperature ranges.

BACKGROUND

Computing devices may store data and used stored data. For example, computing devices may utilize data when providing computer implemented services. If computing devices are unable to access data, process data, and/or perform other functions, then the computing devices may be unable to provide some, or all, of the computer implemented services desired by users of the computing devices.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1A:
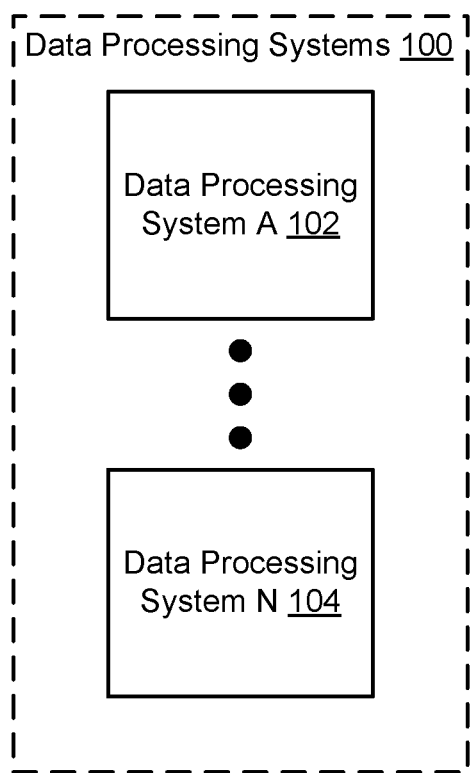
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References in the specification to "adapted to" may, in the context of a programmable device, indicate that the programmable device has been programmed to perform the functionality described with respect to the programmable devices. In the context of a static device, "adapted to" may indicate that the device include circuitry to perform the functionality described with respect to the static devices.

In general, embodiments disclosed herein relate to methods and systems for managing the operation of data processing system. The data processing system may provide computer implemented services.

To provide the computer implemented services the data processing system may include various hardware components. The hardware components may have thermal operating limits that must be met for the hardware components to operate nominally (e.g., with low probability of error, low chance of damage/failure, etc.).

To maintain the hardware components within the thermal operating limits, the data processing system may include a thermal management subsystem. The thermal management subsystem may include a heater that may generate heat to warm the hardware components when they are below their thermal operating limits.

To manage the operation of the heater, the thermal management subsystem may include a distributed management system, and a portion of which may also be temperature sensitive. To set the operating points of the components of the thermal management system, each of the management components may implement a similar thermal management model. By doing so, each of the components of the distributed management system may be capable to independently operate and manage operation of the thermal management subsystem in a manner consistent with overall thermal management goals for the data processing system.

For example, each of the management components of the distributed management framework may take into account similar thermal information (e.g., ambient temperatures) and thermal limits (e.g., operating temperature ranges) on the various components of the distributed system when making thermal management subsystem management decisions.

By doing so, embodiments disclosed herein may provide a data processing system capable of operating under a wider array of environment conditions by mitigating (e.g., reducing, limiting, etc.) the impact of environmental conditions in which the data processing system resides. Thus, embodiments disclosed herein may address the technical problem of operating condition limitations of data processing systems. The disclosed embodiments may address this problem by providing a data processing system with active heating capabilities (e.g., usable to warm components that may otherwise be inoperable thereby robbing the data processing systems of some of their capabilities) that also proactively identifies and mitigates the impact of ambient temperatures on the components of the data processing system.

In an embodiment, a data processing system that provides computer implemented services is provided. The data processing system may include a management controller adapted to, while operating, manage operation of the data processing system; a heater positioned to, while powered, selectively warm a flow of a gas directed to warm the management controller; a temperature sensor positioned to identify an ambient temperature; a fan adapted to selectively generate the flow of the gas; a thermal manager adapted to: perform, using the heater and the fan, a startup procedure for the data processing system that increases and maintains a temperature of the management controller above a temperature threshold associated with the management controller while an ambient temperature is below the temperature threshold until the management controller begins operation as part of the startup procedure; and perform, using the heater and the fan, a temperature maintaining handoff from management of the data processing system by the management controller to management of the data processing system by the thermal manager.

Performing the startup procedure may include identifying a startup of the data processing system, the management controller being inoperable at a start of the startup; based on the identified startup: obtaining, during the startup and prior to operation of the management controller, a temperature measurement of the ambient temperature using the temperature sensor; making a determination regarding whether the temperature measurement is below the temperature threshold; in an instance of the determination where the ambient temperature is below the temperature threshold: pausing the startup prior to the management controller operating during the startup; while the startup is paused, initiating performance of a warming procedure based on the ambient temperature; after completing the warming procedure, resuming the startup and setting operation of one or more of the fan and the heater to maintain a temperature of the management controller above the threshold until the management controller begins operation during the startup; and after the management controller is operational, handing off management of the fan and the heater to the management controller to complete the startup and initiate performance of the computer implemented services.

Setting the operation of the one or more of the fan and the heater may include identifying the ambient temperature; and setting a rate of operation of a fan based on the ambient temperature and the threshold.

Setting the operation of the one or more of the fan and the heater may also include identifying a duration of time between when the startup is resumed to when the management controller begins to operate as part of the startup. The rate of operation of the fan may also based on the duration of time.

Setting the operation of the one or more of the fan and the heater may additionally include: setting a rate of operation of the heater based on the ambient temperature and the threshold.

The rate of operation of the fan may be set to limit an estimated rate of cooling of the management controller so that a management controller temperature is above the threshold.

The threshold may be 0° Celsius, or between 1° and 5° degrees Celsius.

In an embodiment, a computer-implemented method is provided. The computer-implemented may provide the functionality of the data processing system and/or components thereof, discussed above.

In an embodiment, a non-transitory media is provided. The non-transitory media may include instructions that when executed by a processor cause the computer-implemented method to be performed.

Turning to FIG. 1A, a block diagram illustrating a system in accordance with an embodiment is shown. The system shown in FIG. 1 may provide any quantity and type of computer implemented services. To provide the computer implemented services, the system of FIG. 1 may include data processing systems 100.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Data processing systems 100 may provide other types of computer implemented services without departing from embodiments disclosed herein. Data processing systems 100 may each provide similar and/or different computer implemented services, and any of data processing systems 100 may provide any of the computer implemented services in cooperation with other data processing systems and/or independently.

To provide computer implemented services, data processing systems 100 may need to operate in a predetermined manner. The predetermined manner of operation may include, for example, executing an operating system, drivers, and/or other type of management entities that mediate, facilitate, or otherwise operate in a manner which enables the applications to operate (e.g., by providing abstracted access to hardware resources used in the execution of the applications).

To operate in the predetermined manner, data processing systems 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation management of the data processing system to an operating system or other type of operational management entity that places data processing systems 100 into the predetermined manner of operation. The operating system may, for example, provide abstracted access to resources (e.g., processing resources provided by processors, memory resource provided by memory modules, storage resources provided by storage devices, etc.) utilized by the applications hosted by the data processing system.

For example, consider a scenario where a data processing system has been shut off. After the data processing system is turned on, the data processing system may be operating in a startup manner such that the data processing system is not yet able to support execution of an application (e.g., the application may not be able to successfully execute until the data processing system hosts an operating system or other type of management entity). To enter the predetermine manner of operation conducive to execution of the application, the data processing system may go through a boot process (e.g., a startup) which may be performed by one or more types of management entity such as a basic input-output system and/or other startup management entities. The management entity may perform any number of actions (e.g., a "startup process") to prepare the data processing system to begin execution of an operating system and/or other type of management entity that facilitates execution of applications.

To perform the startup process and provide the computer implemented services, data processing systems 100 may include various hardware components (e.g., integrated circuit-based devices). The hardware components may perform various types of functionalities including, for example, (i) data processing functionality through which the computer implemented services may be provided, (ii) system management functionality through which the operation of the respective data processing systems may be managed, and/or (iii) other types of functionalities.

Any of the hardware components may have limitations on their operation. For example, any of the hardware components may have limitations regarding their temperatures (e.g., hardware components having such limitations being referred to as "temperature sensitive hardware components"). The temperature limitations may include a lower temperature limit and an upper temperature limit. If the temperature of a temperature sensitive hardware components is outside of these limitations, then the temperature sensitive hardware components may be impaired (e.g., may not operate, may operate but in an undesirable manner such as including errors in their operation, may be subject to damage if operated, etc.).

In general, embodiments disclosed herein relate to systems, devices, and methods for improving the likelihood that data processing systems 100 are able to provide their computer implemented services. To improve the likelihood that data processing systems 100 are able to provide their computer implemented services, data processing systems 100 may include functionality to warm and cool hardware components.

For example, data processing systems 100 may include heaters and fans. The heaters and fans may be used to generate flows of gasses (e.g., from an ambient environment, from a particular source, etc.). The flows of gasses may be heated by a heater, and/or obtained from a source of cool gas (e.g., an ambient environment, a gas temperature management system, etc.) to provide for warming and/or cooling flows of gasses usable to warm or cool temperature sensitive hardware components.

To decide when and how to generate flows of gasses to warm or cool hardware components, data processing systems 100 may implement a distributed management framework. The distributed management framework may include multiple management components tasked with cooperatively managing the thermal environment of the data processing system. Due to limitations on the thermal operating ranges of some of the management components of the distributed management framework, the distributed management framework may implement procedures to handoff thermal management duties between different components.

When thermal management duties are handed off between the management components, the management components may share information and/or obtain new information to maintain a consistent view of the thermal state of the host data processing system and to ensure compliance with a thermal management model implemented by the distributed management framework. The thermal management model may be used to ensure that, when components of the data processing are tasked with operating the components are within their thermal operating ranges.

Figure 1B:
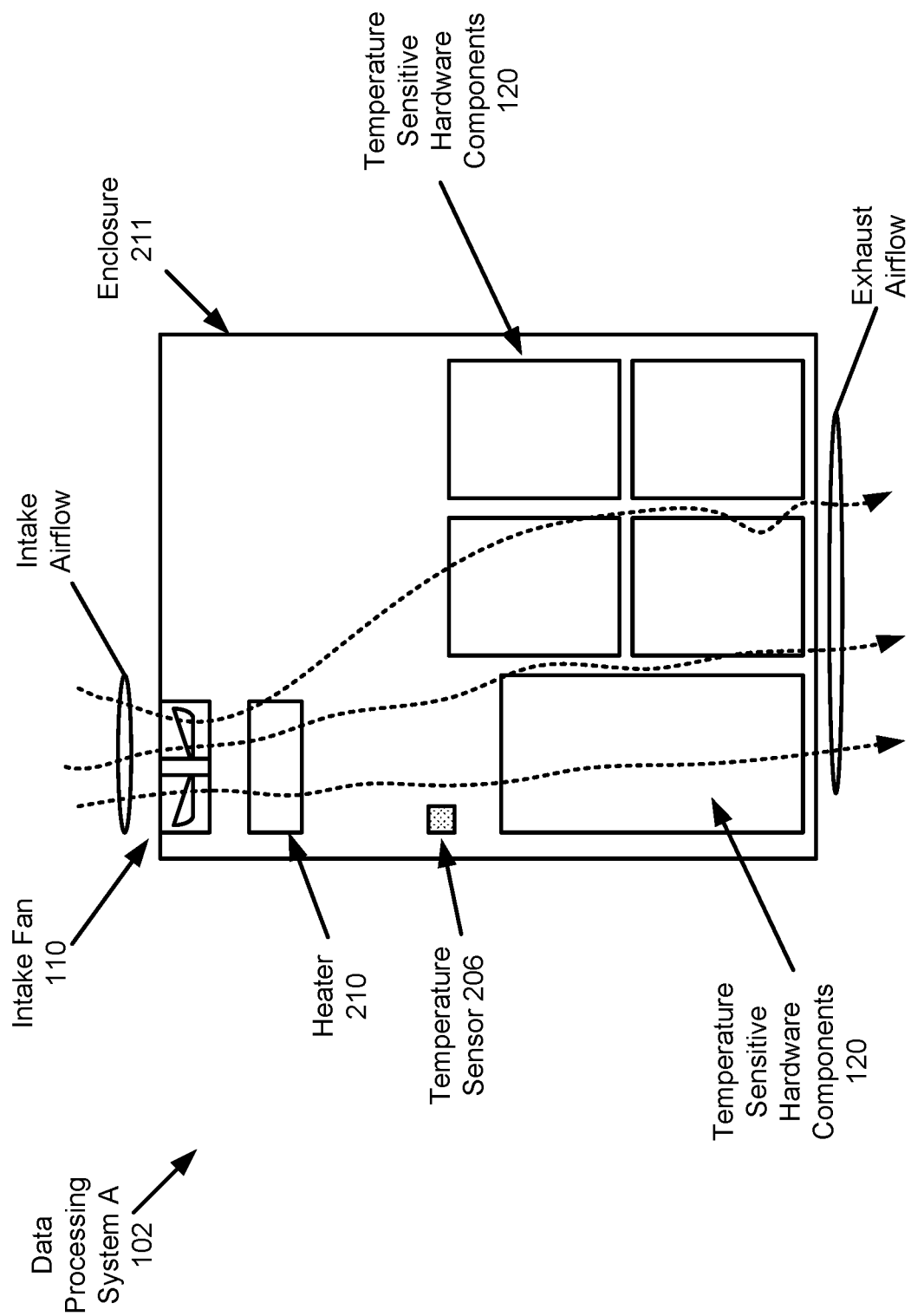
FIG. 1B shows a top view diagram illustrating gas flow in a data processing system in accordance with an embodiment.
Figure 1C:
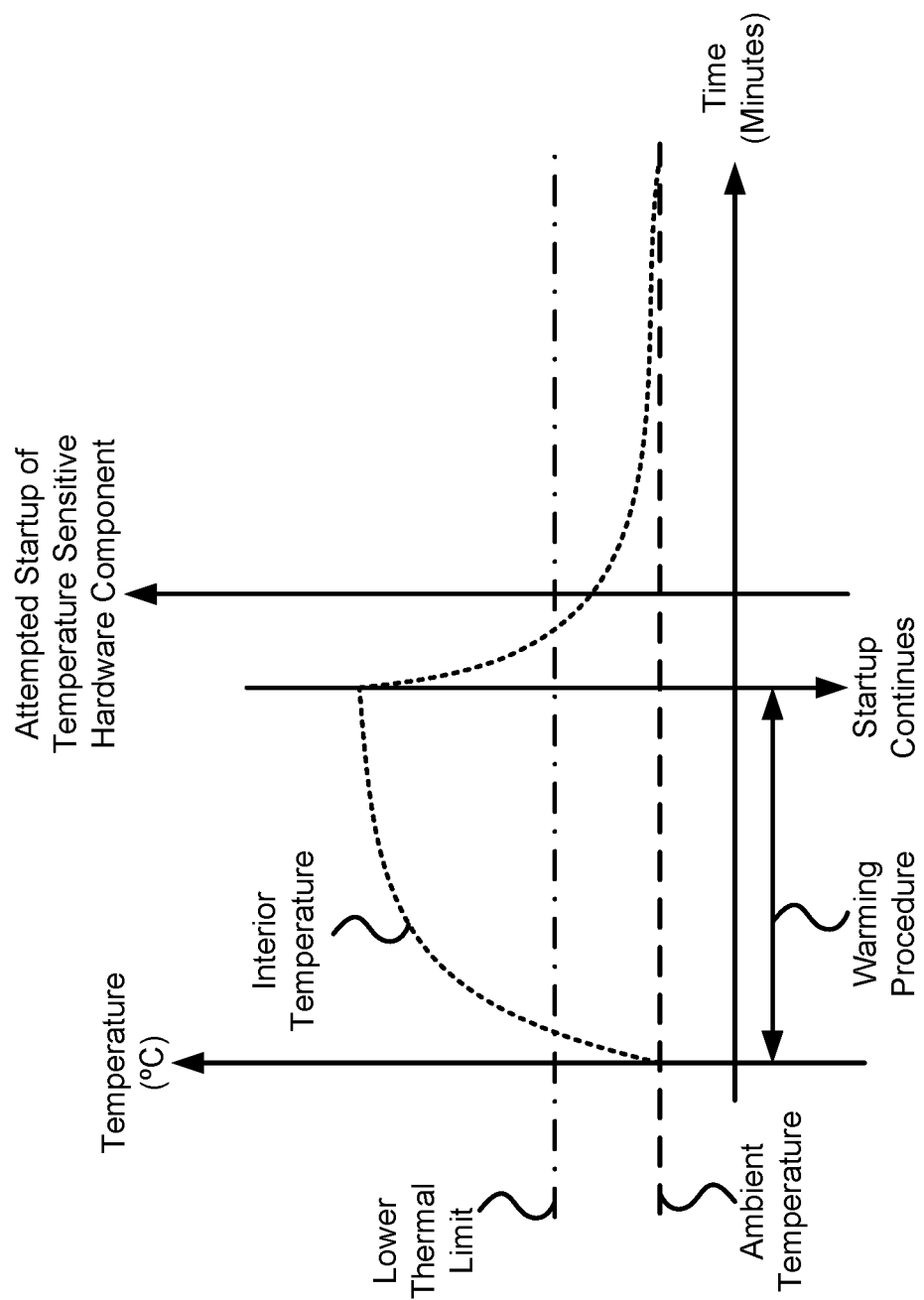
FIG. 1C shows a plot of a temperature in accordance with an embodiment.

For example, thermal management model may require that all thermal management decisions made by the distributed management framework take into account an ambient temperature, a temperature of gasses likely to be drawn into the data processing system, and/or other factors that may need to be taken into account to ensure that components of the data processing system are maintained in their thermal operating ranges while tasked with operating. Refer to FIGS. 1B-1C for additional details regarding maintaining components of data processing systems 100 within their thermal operating ranges while the components are tasked with operating.

By doing so, a data processing system in accordance with an embodiment may be more likely to successfully place itself in condition to provide desired computer implemented services under a wider variety of operating conditions. Thus, embodiments disclosed herein may address the technical challenge of limited operating conditions of components of data processing systems. The disclosed data processing systems may represent an improvement in computing technology by being more likely to successfully operate in varying operating conditions, and, in particular, an environment where ambient conditions (e.g., temperatures below the thermal operating ranges of the components) may otherwise preclude operation of components of data processing systems 100.

Figure 2:
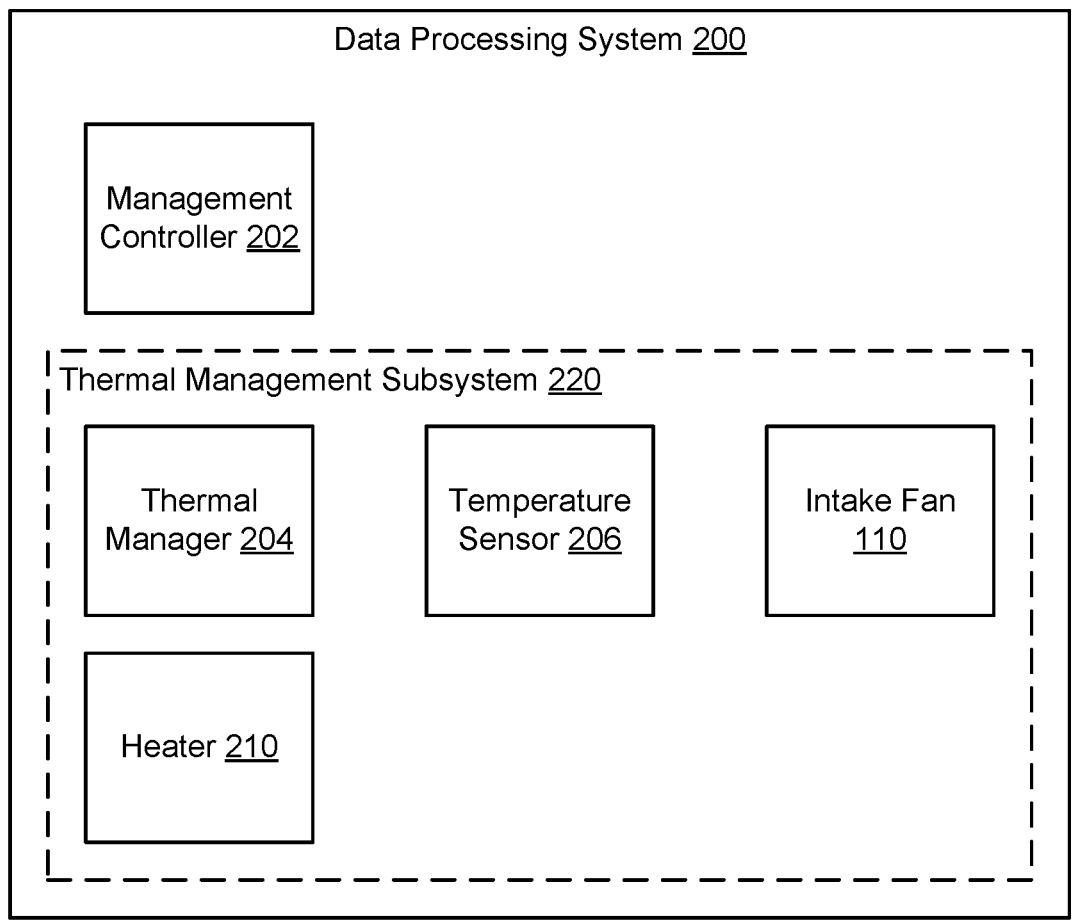
FIG. 2 shows a block diagram illustrating a data processing system in accordance with an embodiment.
Figure 3A:
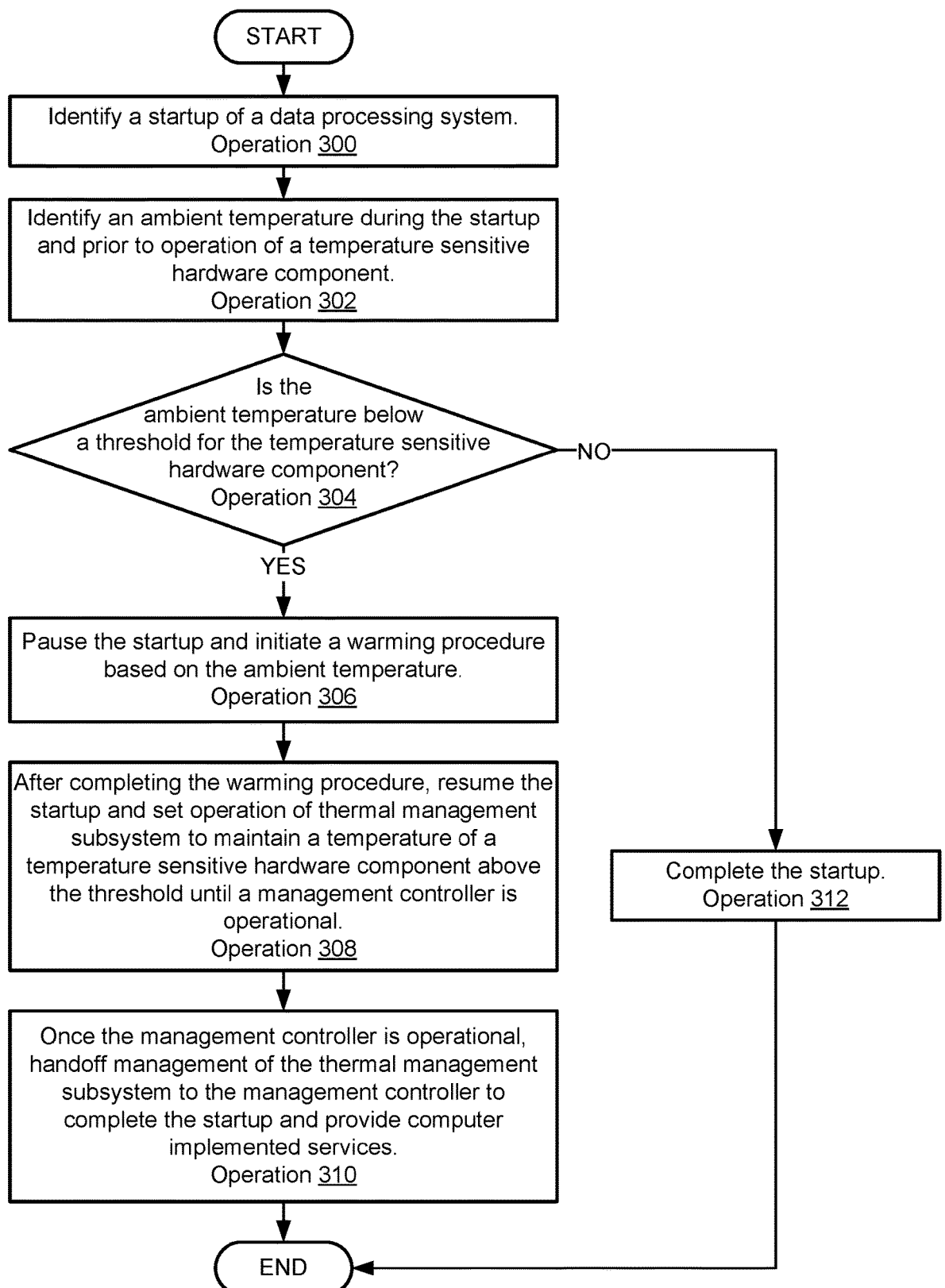
FIG. 3A shows a flow diagram illustrating a method of providing computer implemented services with a data processing system in accordance with an embodiment.
Figure 3B:
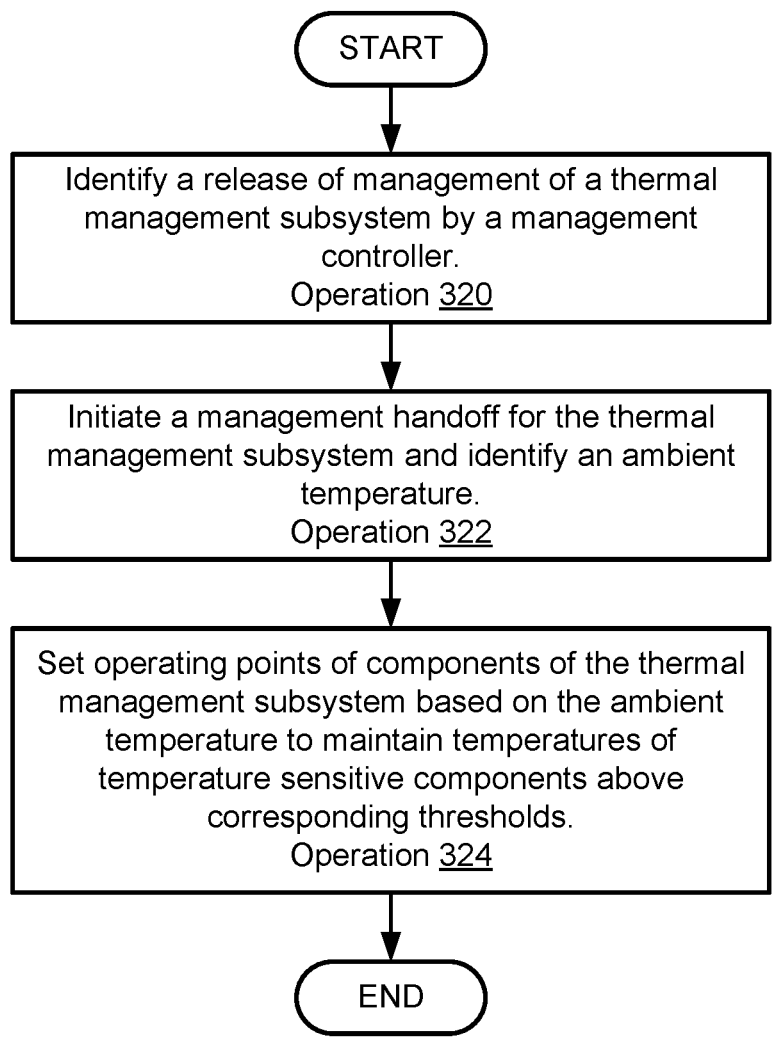
FIG. 3B shows a flow diagram illustrating a method of managing a thermal management subsystem in accordance with an embodiment.

When providing their functionalities, any of data processing systems 100 may perform all, or a portion, of the methods illustrated in FIGS. 3A-3B. Refer to FIG. 2 for additional details regarding data processing systems.

Any of data processing systems 100 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 4.

The system of FIG. 1 may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG. 1.

Data processing systems 100 may be operably connected to any of each other and/or other devices via a communication system (not shown). The communication system may include one or more networks that facilitate communication between data processing systems 100 (or portions thereof) and/or other devices. The networks may include, for example, wired networks, wireless network, public networks, private network, the Internet, etc.

While illustrated in FIG. 1 as included a limited number of specific components, a system in accordance with an embodiment may include fewer, additional, and/or different components than those illustrated therein.

As noted above, data processing systems may be positioned in ambient environments where they may be exposed to ambient temperatures outside of the operating temperature ranges of the components of the data processing systems. To facilitate operation of data processing systems in such environment, warmed flows of gasses may be used to place temperatures of components of data processing systems within the operating temperatures of the components. FIG. 1B shows an example of airflows (e.g., flows of any types of gasses) that may be used to warm components of data processing systems, and FIG. 1C shows a diagram illustrating potential transient thermal impacts due to warming of the components.

Turning to FIG. 1B, a top view diagram of data processing system A 102 in accordance with an embodiment is shown. Any of data processing systems 100 may be similar to data processing system A 102.

As seen in FIG. 1B, data processing system A 102 may include any number of temperature sensitive hardware components 120. Temperature sensitive hardware components 120 may have limited thermal operating ranges. For example, one or more of temperature sensitive hardware components 120 may be management components tasked with implementing the distributed management framework for thermal management of data processing system A 102.

To warm temperature sensitive hardware components 120 to be within their thermal operating ranges, data processing system A 102 may include intake fan 110, heater 210, and temperature sensors 206. While these components are illustrated in FIG. 1B with respect to specific example placements, it will be understood that any of these components may be positioned in other locations than as illustrated in FIG. 1B. For example, temperature sensor 206 may be positioned between intake fan 110 and heater 210, outside of enclosure 211 (e.g., a chassis) of data processing system A 102, or in other locations.

Heater 210 may selectively heat a flow of gas (illustrated in FIG. 1B with dashed lines terminating in arrows). The flow of gas may traverse proximate to one or more of temperature sensitive hardware components 120 thereby allowing them to be warmed.

Intake fan 110 may selectively (e.g., at different points in time, under the direction of other components) generate the flow of gas. Intake fan 110 may be implemented with, for example, an electrical motor, fan blades, a housing, etc.

To manage heating using heater 210 and intake fan 110, data processing system A 102 may include temperature sensor 206. Temperature sensor may be used by components of the distributed management framework to maintain a consistent view of the thermal state of various portions of data processing system A 102, an ambient temperature, a temperature of gasses drawn into enclosure 211 via an intake airflow generated by intake fan 110.

For example, the management components may use temperature sensor and/or share information acquired via temperature sensor 206 to maintain a consistent view of data processing system A 102. By doing so, all of the management components of the distributed management framework may make decisions in managing the operation of intake fan 110, heater 210, and/or other components in accordance with a thermal management model.

Any of the management components of the distributed management framework may include different capabilities both in terms of thermal operating range and data processing capability. For example, some of the management components may include significant data processing capabilities allowing these components to perform complex calculations for ascertaining how to manage the operation of other components. In contrast, other management components may include fewer data processing capabilities thereby restricting these management components from performing complex calculations thereby requiring these other management components to implement reduce complexity algorithms for managing the operation of other components.

To implement the thermal management model across these components, different algorithms, complementary to the data processing capabilities of each of the management components, may be deployed to different management components. To tailor the algorithms to the capabilities of the host management components, the algorithms may be limited to performance under certain operating conditions.

For example, some of the algorithms implemented by certain management components may be tailored to facilitate management of other components during startup of data processing system A 102, while other algorithms may be tailored to facilitate management of other components during unexpected handover scenarios (e.g., where a primary management component becomes unavailable due to, for example, an error in operation).

Turning to FIG. 1C, a plot showing a temperature in accordance with an embodiment is shown. In FIG. 1C, the temperature may be measured by temperature sensor 206 shown in FIG. 1C. The measured temperature may be an interior temperature of the enclosure of a data processing system. As seen in FIG. 1C, the ambient temperature may be below a lower thermal limit of a temperature sensitive hardware components.

Now consider an example scenario where the temperature sensitive is a management components such as a management controller. The management controller may be a member of a distributed management framework.

At time zero (e.g., at the origin of the plot), the data processing system may power on. When powered on, the data processing system may identify that the interior temperature is below the lower thermal limit of the management component. Consequently, the data processing system may refrain from operating the management component, delay the startup, and perform a warming procedure. The warming procedure may include activating a fan and a heater to warm temperature sensitive hardware components (e.g., as part of the warming procedure, which may take some amount of time to complete). As seen in FIG. 1C, the warming may cause the interior temperature to rise above the lower thermal limit of the management component thereby place the management component in condition for operation.

Once the warming procedure completes, the startup may continue. However, if the startup continues without taking into account the ambient temperature, then the startup may fail. For example, a distributed management framework does not take into account the ambient temperature, then the distributed management framework may activate a fan and disallow heating by the heater under the presumption that the hardware components of the data processing system will be active and need to be cooled.

As seen in FIG. 1C, if this occurs, then when an attempted startup of the temperature sensitive hardware component is initiated, the temperature of the management component may have already fell below the lower thermal limit thereby prevent its successful operation.

To address this example scenario and other scenarios involving periods of time when management components become unavailable for management of thermal management subsystem, the remaining management components may take into account the temperature of the ambient environment, the temperature of gasses drawn into the data processing system, and/or other factors impacting thermal management of temperature sensitive hardware components.

For example, rather than presuming that the hardware components require cooling during their operation, the remaining operable management controllers may identify and use information regarding the ambient environment to ascertain how to manage operation of thermal management systems. The obtain information may be used, for example, to select duty cycles for fans and heaters of the thermal management subsystem. By doing so, the temperatures of temperature sensitive components may be more likely to be retained within their thermal operating ranges in advance of expected operation of the temperature sensitive management components.

By doing so, the data processing system may improve the likelihood of providing desired computer implemented services by proactively identifying and using thermal environmental factors in deciding how to manage the operation of thermal management subsystems. As used herein, a subsystem may refer to a logical grouping of components of a devices that contribute to a particular function of the device. The components of the device may be members of multiple subsystems without departing from embodiments disclosed herein.

Turning to FIG. 2, a diagram of an example data processing system 200 in accordance with an embodiment is shown. Data processing system 200 may be similar to any of data processing systems 100.

Data processing system 200 may provide any number and type of computer implemented services. To provide the computer implemented services, data processing system 200 may include various hardware components (e.g., processors, memory modules, storage devices, etc., not shown in FIG. 2).

To manage its own operation, data processing system 200 may include management components (e.g., hardware components) such as management controller 202 and various subsystems such as thermal management subsystem 220 which may also include management components such as thermal manager 204. Each of these components is discussed below.

Management controller 202 may manage the operation of data processing system 200. To do so, management controller 202 may monitor the operation of data processing system 200 and take action to remediate undesired operation. As part of its functionality, management controller 202 may manage the operation of thermal management subsystem 220. The operation of management controller 202 may contribute to maintaining the temperatures of temperature sensitive hardware components 120 within their thermal operating ranges.

For example, management controller 202 may actively identify the temperatures of various hardware components and provide instructions to or otherwise control the operation of intake fan 110 and heater 210 to keep them within their thermal operating ranges.

When providing its functionality, management controller 202 may perform all or a portion of the methods shown in FIGS. 3A-3B.

Generally, management controller 202 may be implemented using an in-band or out-of-band management controller. However, management controller 202 may be a temperature sensitive hardware component. For example, management controller 202 may have a lower thermal operating range of 0° Celsius. Consequently, management controller 202 may not successfully operate if its temperature falls below this lower thermal operating range. Management controller 202 may be a member of the distributed management framework implemented by data processing system 200.

Thermal management subsystem 220 may manage the thermal state of various hardware components of data processing system 200, including management controller 202. To manage the thermal state of the various hardware components, thermal management subsystem 220 may (i) take into account the local thermal environment when deciding how to operate various components such as intake fan 110 and heater 210, (ii) monitor operation of management controller 202 to identify periods of time when management controller is inoperable, and (iii) automatically take over management of various components of thermal management subsystem 220 during periods of time when management controller 202 is inoperable based on a view of the thermal environment of data processing system 200 consistent with that of management controller 202. To provide its functionality, thermal management subsystem 220 may include thermal manager 204, temperature sensor 206, and heater 210. Each of these components is discussed below.

Thermal manager 204 may manage the operation of the other components of thermal management subsystem 220, and perform monitoring of management controller 202. To monitor management controller 202, thermal manager 204 may listen for a heartbeat signal provided by management controller 202, may listen for messages (e.g., from management controller 202 or other components) indicate the operational state of management controller 202, etc.

Thermal manager 204 may be a member of the distributed management framework. When providing its functionality, thermal manager 204 may maintain a view of the thermal state of data processing system 200 consistent with other members of the distributed management framework. To do so, thermal manager 204 may, for example, (i) obtain temperature measurements using temperature sensor 206, (ii) obtain information (e.g., temperature measurements) from other members of the management framework (e.g., via shared memory, messages, and/or other communication frameworks) usable to maintain view consistency, (iii) monitor performance of various processes (e.g., startups, restarts, etc.), (iv) estimate durations of time during which hardware components may be exposed to warm and/or cold conditions during the performance of the processes, and/or (v) manage operation of intake fan 110, heater 210, and/or other thermal management components based on the obtained information to improve the likelihood that hardware components of data processing system 200 are maintained within their thermal operating ranges leading up to and during operation.

When providing its functionality, thermal manager 204 may perform all or a portion of the methods shown in FIGS. 3A-3B.

In an embodiment, thermal manager 204 is implemented using a hardware device including circuitry. The hardware device may be, for example, a programmable logic device, digital signal processor, a field programmable gate array, an application specific integrated circuit, or another type of hardware component usable to process data in a data processing system environment. The circuitry may be adapted to cause the hardware device to perform the functionality of thermal manager 204. Thermal manager 204 may be implemented using other types of hardware devices without departing embodiment disclosed herein.

In an embodiment, thermal manager 204 is implemented using a processor adapted to execute computing code stored on a persistent storage that when executed by the processor performs the functionality of thermal manager 204 discussed throughout this application. The processor may be a hardware processor including circuitry such as, for example, a central processing unit, a processing core, or a microcontroller. The processor may be other types of hardware devices for processing information without departing embodiment disclosed herein.

Temperature sensor 206 may monitor (e.g., directly, or indirectly) the temperature of gas flows and/or components heated by heater 210 and provide information regarding the temperature to other components such as management controller 202 and/or other components or devices. Temperature sensor 206 may be implemented with, for example, a thermocouple or other temperature measurement component.

Intake fan 110 may selectively generate flows of gas through data processing system 200. The flow of gas, when generated, may traverse near temperature sensitive hardware components such as management controller 202. As noted above, intake fan 110 may be implemented with, for example, an electric motor, blades, a housing, and/or other components.

Heater 210 may selectively heat various components of data processing system 200. Heater 210 may be implemented with, for example, a resistive heater and/or a power supply. The power supply and/or resistive heater may be controller by management controller 202, thermal manager 204, and/or other components.

While illustrated in FIG. 2 with a limited number of specific components, a data processing system may include additional, fewer, and/or different components without departing from embodiments disclosed herein.

As discussed above, the components of FIGS. 1A-2 may perform various methods to increase the likelihood of data processing systems being able to provide computer implemented services. FIGS. 3A-3B illustrate examples of methods that may be performed by the components of FIGS. 1A-2. In the diagrams discussed below and shown in these figures, any of the operations may be repeated, performed in different orders, omitted, and/or performed in parallel with or a partially overlapping in time manner with other operations.

Turning to FIG. 3A, a flow diagram illustrating a method of performing a startup of a data processing system to provide computer implemented services in accordance with an embodiment is shown. The method may be performed, for example, by a data processing system, a thermal manager, a management controller, and/or other components illustrated in FIGS. 1A-2.

At operation 300, a startup of the data processing system is identified. The startup may be identified, for example, monitoring for the data processing system being powered on, restarted, or otherwise initiating performance of the startup.

In an embodiment, upon startup, the operation of temperature sensitive hardware components of the data processing may not be initiated. Rather, the operation of these components may be delayed until it is likely that the temperatures of the temperature sensitive hardware components are within their thermal operating ranges. Due to the environment in which the data processing system may reside, any of the temperature sensitive hardware components may be outside of their thermal operating ranges when the data processing system initiates the startup.

For example, upon startup, the ambient temperature may be below that of the thermal operating range of a management controller of a distributed management framework. In such a scenario, by not immediately initiating operation of the management controller, the management controller may be prevented from operating under thermal conditions that may be problematic to its operation.

At operation 302, an ambient temperature is identified during the startup and prior to operation of a temperature sensitive hardware components (e.g., a management controller). The ambient temperature may be identified by reading a temperature sensor, reading a stored temperature sensor measurement, and/or via other methods.

At operation 304, a determination is made regarding whether the ambient temperature is below a threshold for the temperature sensitive hardware component. The threshold may be the lowest temperature within the thermal operating range of the temperature sensitive hardware component. The determination may be made by comparing the ambient temperature identified in operation 302 to the threshold.

If the ambient temperature is below the threshold, then the method may proceed to operation 306. Otherwise, the method may proceed to operation 312.

At operation 306, the startup is paused, and a warming procedure is initiated based on the ambient temperature. The startup may be paused by, for example, suspending execution of a startup management entity hosted by a data processing system. The warming procedure may be initiated by (i) identifying the warming procedure, (ii) issuing instructions and/or otherwise controlling operation of a fan and heater (and/or other component) based on the identified warming procedure, and/or (iii) monitoring and/or adjusting the warming process.

The warming procedure may be specified by, for example, a set of steps to be performed. The set of steps may be translated into the instruction and/or may be otherwise used to control the operation of the fan, heater, and/or other components (e.g., as specified by the procedure). The procedure may specify, for example, operating the fan and heater at predetermined operating points (e.g., fan revolutions per minute, heater heat generation rate) for predetermined durations of time.

The warming procedure may be identified by, for example, matching the identified ambient temperature to a temperature associated with one warming procedure of multiple warming procedures. For example, a warming procedure database may specify different warming procedures and may associate them with different warming procedures. The warming procedures may be preprogrammed to the data processing system, and may be based on, for example, experimental data where similar data processing systems have been operated in controlled environments having corresponding ambient temperatures to identify procedures that are successful at warming a data processing system to a predetermined temperature (or at least to exceed a threshold).

At operation 308, after completing the warming procedure, the startup is resumed, and operation of a thermal management subsystem is set to maintain a temperature of the temperature sensitive hardware component above the threshold. The temperature may be maintained above the threshold until a management controller is operational (e.g., an able to take over management of the data processing system).

In an embodiment, the temperature is maintained above the threshold by (i) identifying the ambient temperature (e.g., which may have been saved from operation 302), (ii) identifying a duration of time between the startup is resumed and when the management controller will begin to operate as part of the startup, and (iii) setting an operation rate of the fan and an operation rate of the heater based on the identified ambient temperature, the threshold, and the duration of time. For example, the temperatures and time may be used to calculate an acceptable rate of temperature decease (e.g., a cooling rate) that will retain the temperature of the management controller above the threshold.

In an embodiment, the operating rate of the fan and/or the heater are identified by performing a lookup in a data structure. The temperature, threshold, and duration of time (and/or rate of cooling) may be used as a key to identify the corresponding operating rates from a database or other type of data structure. The database (or other data structure) may include operating rates for the fan and/or heater for a variety of different temperatures and durations of time.

In an embodiment, the operating rate of the fan and/or the heater are identified by using default rates. For example, default operating rates for varying operational conditions (e.g., performance of a startup, failure of a management controller, etc.) of the data processing system may be stored in a data structure. The operational conditions may be identified and used to identify the corresponding operating rates.

The operation of the thermal management subsystem may be set, for example, by a thermal manager providing instructions to and/or otherwise directing the operation of the fan, the heater, and/or other components of the thermal management subsystem. For example, the identified operating rates may be used as a basis for controlling operation of the corresponding components.

At operation 310, after the management controller is operational, management of the thermal management system may be handed off to the management controller to complete the startup. Prior to handoff, a thermal manager may have managed operation (e.g., directed operation of the components) of the thermal management subsystem. Management may be handed off by, for example, sending instructions to the management controller to take over management, automatically by virtue of the initiation of operation of the management controller, and/or via other methods.

The method may end following operation 310.

Returning to operation 304, the method may proceed to operation 312 following operation 304 when the ambient temperature is below the threshold.

At operation 312, the startup is completed. The startup may be completed by resuming execution of the startup (e.g., beginning execution of the startup management entity). No warming procedures may be performed when the NO path is followed after operation 312.

However, cooling procedures may be initiated depending on the ambient temperature. For example, if the ambient temperature and/or temperature of the hardware component indicate that a temperature of the hardware component may exceed its thermal operating range, then cooling procedures (e.g., operation of fans and/or other types of cooling components) may be initiated during the startup. The cooling procedures may retain various components (e.g., startup management entities) within their thermal operating ranges, and may respond dynamically to retain the temperatures of the various components within the thermal operating ranges.

The method may end following operation 312.

Using the method illustrated in FIG. 3A, embodiments disclosed herein may facilitate completion of startups during challenging weather conditions and proactively addressing cooling due to the challenging weather conditions that may otherwise prevent successful operation of data processing systems. For example, a thermal manager may perform, using the heater and the fan, a startup procedure for the data processing system that increases and maintains a temperature of the management controller above a temperature threshold. The temperature threshold may be associated with the management controller. During the startup procedure, an ambient temperature may be below the temperature threshold until the management controller begins operation as part of the startup procedure. Consequently, handoff to management of the operation of the data processing system by the management controller may be more likely to be successful through proactive warming of the management controller.

Turning to FIG. 3B, a flow diagram illustrating a method managing operation of a data processing system when operation of a management controller is suspended in accordance with an embodiment is shown. The method may be performed, for example, by a data processing system, a thermal manager, a management controller, and/or other components illustrated in FIGS. 1A-2.

Prior to operation 320, a management controller may begin operation and manage operation of a host data processing system, and a thermal management system thereof.

At operation 320, a release of management of the thermal management system by the management controller is identified. The identification may be made by (i) identifying a lack of a heartbeat signal indicating that the management controller is no longer operating, (ii) receiving a message indicating that the management controller will stop managing the thermal management system, and/or (iii) via other methods. The management controller may release management of the thermal system due to, for example, an unexpected (or expected) termination in operation of the management controller, and/or for other reasons.

At operation 322, a management handoff for the thermal management subsystem is initiated. An ambient temperature may also be identified. The management handoff may be initiated by, for example, a thermal manager inventorying the thermal management subsystem, beginning to communicate with the thermal management subsystem, etc. The ambient temperature may be identified by (i) reading a temperature sensor that measures the ambient temperature, (ii) reading a previous temperature measurement of the ambient temperature from storage, and/or (iii) via other methods.

At operation 324, operating points of components of the thermal management subsystem are set based on the ambient temperature to maintain temperatures of temperature sensitive components above corresponding thresholds. The operating points may be set similarly to the methods of setting discussed with respect to operation 308 of FIG. 3A.

In an embodiment, the operating points are set to cause the hardware components of the data processing system to at least maintain their current temperature. For example, fans may be set at low speeds regardless of the temperatures of the hardware components (e.g., throttling of the hardware components may be relied upon to keep them from overheating).

The method may end following operation 324.

Following operation 324, after the management controller beings to operate, management of the thermal management subsystem may be returned to the management controller. In contrast to the simplified management algorithms implemented while the management controller is unavailable for management, the algorithms employed by the management controller may be more complex, and may take into account other aspects regarding the operation of the data processing system such as, for example, the rate of heat generation by the various hardware components, clustering of hardware components, and/or other characteristics regarding the operation of a host data processing system.

However, by using the method illustrated in FIG. 3B, a data processing system in accordance with embodiments may be less likely have hardware components become inoperable due to temperatures of the hardware components falling below their thermal operating ranges. Accordingly, a data processing system perform a temperature maintaining handoff from management of the data processing system by the management controller to management of the data processing system by the thermal manager. Consequently, the data processing system may maintain consistent management (at least with respect to thermal policy) as various management components of the distributed management framework become inoperable and return to operability over time.

Thus, a data processing system in accordance with embodiments disclosed herein may be more likely to provide desired computer implemented services under a wider variety of environmental conditions (e.g., even sub-zero environments).

Figure 4:
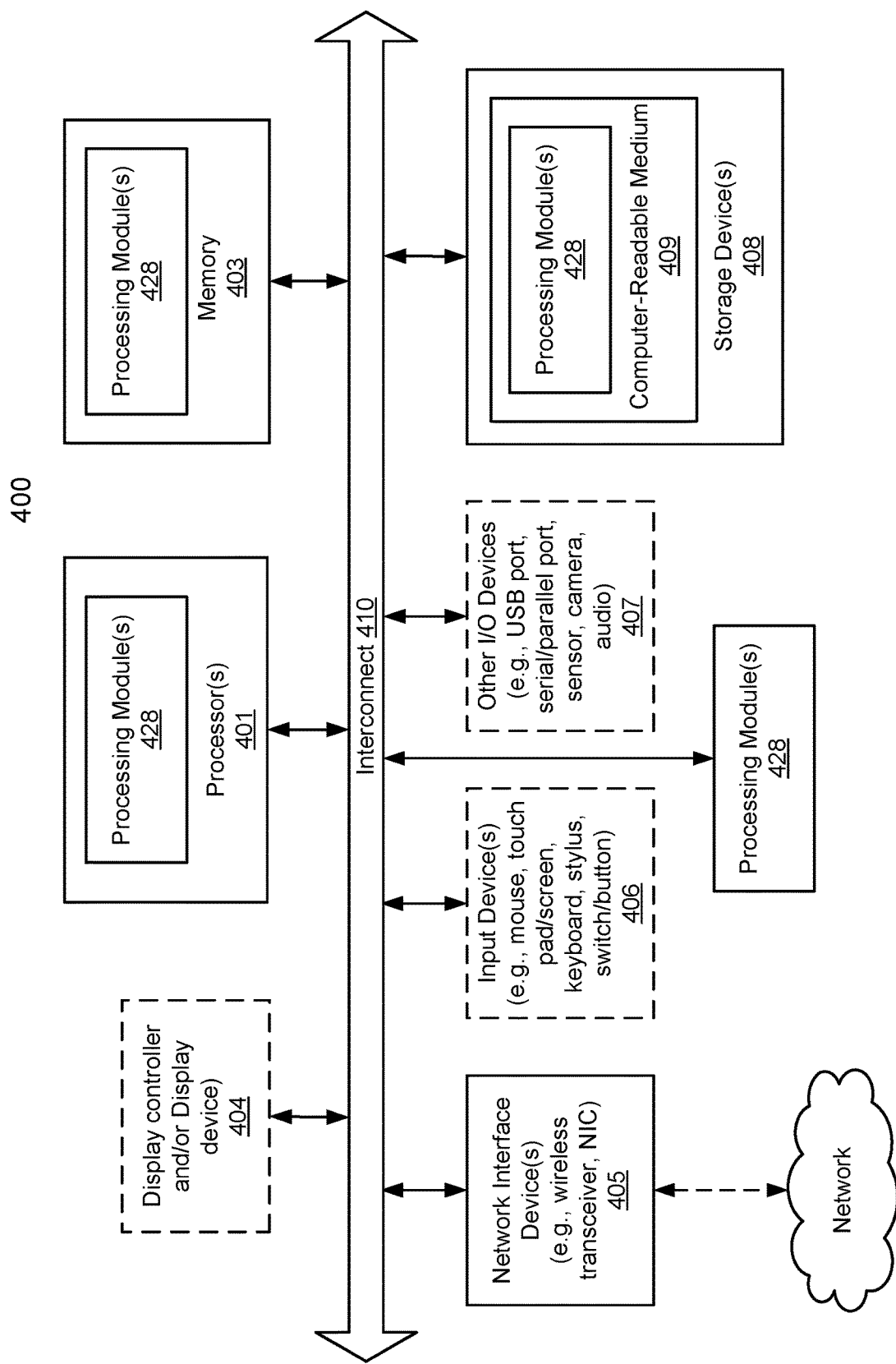
FIG. 4 shows a block diagram illustrating a computing device in accordance with an embodiment.

Any of the components illustrated in FIGS. 1A-2 may be implemented with one or more computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing system that provides computer implemented services, the data processing system comprising:
   a management controller adapted to, while operating, manage operation of the data processing system;
   a heater positioned to, while powered, selectively warm a flow of a gas directed to warm the management controller;
   a temperature sensor positioned to identify an ambient temperature;
   a fan adapted to selectively generate the flow of the gas;
   a thermal manager adapted to:
      perform, using the heater and the fan, a startup procedure for the data processing system that increases and maintains a temperature of the management controller above a temperature threshold associated with the management controller while an ambient temperature is below the temperature threshold until the management controller begins operation as part of the startup procedure; and
      perform, using the heater and the fan, a temperature maintaining handoff from management of the data processing system by the management controller to management of the data processing system by the thermal manager.

2. The data processing system of claim 1, wherein performing the startup procedure comprises:
identifying a startup of the data processing system, the management controller being inoperable at a start of the startup;
based on the identified startup:
obtaining, during the startup and prior to operation of the management controller, a temperature measurement of the ambient temperature using the temperature sensor;
making a determination regarding whether the temperature measurement is below the temperature threshold;
in an instance of the determination where the ambient temperature is below the temperature threshold:
pausing the startup prior to the management controller operating during the startup;
while the startup is paused, initiating performance of a warming procedure based on the ambient temperature;
after completing the warming procedure, resuming the startup and setting operation of one or more of the fan and the heater to maintain a temperature of the management controller above the temperature threshold until the management controller begins operation during the startup; and
after the management controller is operational, handing off management of the fan and the heater to the management controller to complete the startup and initiate performance of the computer implemented services.

3. The data processing system of claim 2, wherein setting the operation of the one or more of the fan and the heater comprises:
identifying the ambient temperature; and
setting a rate of operation of a fan based on the ambient temperature and the temperature threshold.

4. The data processing system of claim 3, wherein setting the operation of the one or more of the fan and the heater further comprises:
identifying a duration of time between when the startup is resumed to when the management controller begins to operate as part of the startup,
wherein the rate of operation of the fan is also based on the duration of time.

5. The data processing system of claim 4, wherein setting the operation of the one or more of the fan and the heater further comprises:
setting a rate of operation of the heater based on the ambient temperature and the temperature threshold.

6. The data processing system of claim 5, wherein the rate of operation of the fan is set to limit an estimated rate of cooling of the management controller so that a management controller temperature is above the temperature threshold.

7. The data processing system of claim 6, wherein the temperature threshold is 0° Celsius.

8. The data processing system of claim 6, wherein the temperature threshold is between 1° and 5° degrees Celsius.

9. A computer-implemented method for providing computer implemented services with a data processing system, the method comprising:
performing, using a heater of the data processing system and a fan of the data processing system, a startup procedure for the data processing system that increases and maintains a temperature of a management controller above a temperature threshold associated with the management controller while an ambient temperature identified by a temperature sensor is below the temperature threshold until the management controller begins operation as part of the startup procedure, the heater being position to selectively warm a flow of gas directed to warm the management controller and the fan being positioned to selectively generate the flow of the gas, and the management controller being adapted to, while operating, manage operation of the data processing system; and
performing, using the heater and the fan, a temperature maintaining handoff from management of the data processing system by the management controller to management of the data processing system by a thermal manager, the thermal manager managing, in part, the startup procedure.

10. The computer-implemented method of claim 9, wherein performing the startup procedure comprises:
identifying a startup of the data processing system, the management controller being inoperable at a start of the startup;
based on the identified startup:
obtaining, during the startup and prior to operation of the management controller, a temperature measurement of the ambient temperature using the temperature sensor;
making a determination regarding whether the temperature measurement is below the temperature threshold;
in an instance of the determination where the ambient temperature is below the temperature threshold:
pausing the startup prior to the management controller operating during the startup;
while the startup is paused, initiating performance of a warming procedure based on the ambient temperature;
after completing the warming procedure, resuming the startup and setting operation of one or more of the fan and the heater to maintain a temperature of the management controller above the temperature threshold until the management controller begins operation during the startup; and
after the management controller is operational, handing off management of the fan and the heater to the management controller to complete the startup and initiate performance of the computer implemented services.

11. The computer-implemented method of claim 10, wherein setting the operation of the one or more of the fan and the heater comprises:
identifying the ambient temperature; and
setting a rate of operation of a fan based on the ambient temperature and the temperature threshold.

12. The computer-implemented method of claim 11, wherein setting the operation of the one or more of the fan and the heater further comprises:
identifying a duration of time between when the startup is resumed to when the management controller begins to operate as part of the startup,
wherein the rate of operation of the fan is also based on the duration of time.

13. The computer-implemented method of claim 12, wherein setting the operation of the one or more of the fan and the heater further comprises:

setting a rate of operation of the heater based on the ambient temperature and the temperature threshold.

14. The computer-implemented method of claim 13, wherein the rate of operation of the fan is set to limit an estimated rate of cooling of the management controller so that a management controller temperature is above the temperature threshold.

15. The computer-implemented method of claim 14, wherein the temperature threshold is 0° Celsius.

16. The computer-implemented method of claim 14, wherein the temperature threshold is between 1° and 5° degrees Celsius.

17. A non-transitory machine-readable medium having instructions stored therein, which when executed by a processor, cause a data processing system to perform operations for providing computer implemented services with a data processing system, the operations comprising:
 performing, using a heater of the data processing system and a fan of the data processing system, a startup procedure for the data processing system that increases and maintains a temperature of a management controller above a temperature threshold associated with the management controller while an ambient temperature identified by a temperature sensor is below the temperature threshold until the management controller begins operation as part of the startup procedure, the heater being positioned to selectively warm a flow of gas directed to warm the management controller and the fan being positioned to selectively generate the flow of the gas, and the management controller being adapted to, while operating, manage operation of the data processing system; and
 performing, using the heater and the fan, a temperature maintaining handoff from management of the data processing system by the management controller to management of the data processing system by a thermal manager, the thermal manager managing, in part, the startup procedure.

18. The non-transitory machine-readable medium of claim 17, wherein performing the startup procedure comprises:
 identifying a startup of the data processing system, the management controller being inoperable at a start of the startup;
 based on the identified startup:
  obtaining, during the startup and prior to operation of the management controller, a temperature measurement of the ambient temperature using the temperature sensor;
  making a determination regarding whether the temperature measurement is below the temperature threshold;
  in an instance of the determination where the ambient temperature is below the temperature threshold:
   pausing the startup prior to the management controller operating during the startup;
   while the startup is paused, initiating performance of a warming procedure based on the ambient temperature;
   after completing the warming procedure, resuming the startup and setting operation of one or more of the fan and the heater to maintain a temperature of the management controller above the temperature threshold until the management controller begins operation during the startup; and
   after the management controller is operational, handing off management of the fan and the heater to the management controller to complete the startup and initiate performance of the computer implemented services.

19. The non-transitory machine-readable medium of claim 18, wherein setting the operation of the one or more of the fan and the heater comprises:
 identifying the ambient temperature; and
 setting a rate of operation of a fan based on the ambient temperature and the temperature threshold.

20. The non-transitory machine-readable medium of claim 19, wherein setting the operation of the one or more of the fan and the heater further comprises:
 identifying a duration of time between when the startup is resumed to when the management controller begins to operate as part of the startup,
 wherein the rate of operation of the fan is also based on the duration of time.

* * * * *